United States Patent [19]
Halene et al.

[11] Patent Number: 6,099,435
[45] Date of Patent: Aug. 8, 2000

[54] POWER TRAIN WITH HYDROKINETIC TORQUE CONVERTER

[75] Inventors: Clemens Halene, Wooster; Ravi Gundlapalli, Copley; Allan Biber, Canton; Volker Middelmann, Wooster, all of Ohio; Bruno Müller, Bühlertal, Germany

[73] Assignee: Luk Getriebe-Systeme GmbH, Buhl/Baden, Germany

[21] Appl. No.: 09/265,741

[22] Filed: Mar. 10, 1999

[30] Foreign Application Priority Data

Mar. 13, 1998 [DE] Germany .......................... 198 10 850

[51] Int. Cl.⁷ .......................... B60K 41/02; F16H 45/02
[52] U.S. Cl. .......................... 477/62; 192/3.29; 192/3.3
[58] Field of Search .......................... 477/62, 64, 74, 477/169, 171; 192/3.23, 3.24, 3.29, 3.3

[56] References Cited

U.S. PATENT DOCUMENTS

| | | |
|---|---|---|
| 5,377,796 | 1/1995 | Friedmann et al. . |
| 5,551,932 | 9/1996 | Ishii et al. .......................... 477/171 X |
| 5,553,694 | 9/1996 | Schulz et al. . |
| 5,575,363 | 11/1996 | Dehrmann et al. . |
| 5,674,155 | 10/1997 | Otto et al. .......................... 477/169 X |
| 5,679,091 | 10/1997 | Salecker et al. . |
| 5,738,198 | 4/1998 | Walth et al. . |
| 5,782,327 | 7/1998 | Otto et al. . |
| 5,807,209 | 9/1998 | Matsubara et al. .......................... 477/169 X |
| 5,813,506 | 9/1998 | Maeda et al. .......................... 192/3.29 |
| 5,918,713 | 7/1999 | Shimizu et al. .......................... 192/3.29 |

FOREIGN PATENT DOCUMENTS

44 31 640 1
A1 4/1995 Germany .

*Primary Examiner*—Rodney H. Bonck
*Attorney, Agent, or Firm*—Darby & Darby

[57] ABSTRACT

The invention relates to a power train which is to be utilized in a motor vehicle and employs a hydrokinetic torque converter—lockup clutch—electronic control system assembly operating in such a way that the lockup clutch is already at least partially engaged while the engine of the motor vehicle is running but the vehicle is at a standstill. This reduces the likelihood of the development of shocks during shifting of a manual, automated or continuously variable transmission which receives torque from the output element of the torque converter. Another feature of the invention resides in the provision of a compact, lightweight and inexpensive design of the torus composed of the impeller, reactor and stator of the hydrokinetic torque converter.

23 Claims, 4 Drawing Sheets

POWER TRAIN WITH HYDROKINETIC TORQUE CONVERTER

BACKGROUND OF THE INVENTION

The invention relates to motor vehicles in general, and more particularly to improvements in power trains for use in motor vehicles. Still more particularly, the invention relates to improvements in power trains which employ hydrokinetic torque converters with so-called bypass or lockup clutches.

Published German patent application Serial No. 44 31 640 discloses a power train wherein the hydrokinetic torque converter is installed between the rotary output element of an internal combustion engine and the input element of a change-speed transmission. The torque converter is particularly effective while the motor vehicle is being set in motion because, when the lockup clutch is disengaged, the torque converter ensures the achievement of a pronounced torque conversion. If the torque converter is not equipped or combined with a lockup clutch, losses at a high RPM of the internal combustion engine are very high, and this entails an unacceptably high fuel consumption. The lockup clutch is utilized to achieve savings in fuel and to improve the quality of emitted combustion products; such clutch is put to use to operate with slip or to be fully engaged when the engine RPM is high and the motor vehicle is operated at a high speed. This, in turn, entails the development of readily audible changes of RPM and/or readily detectable changes of pull and/or a readily detectable shock or tug in the power train of the motor vehicle. Such phenomena are, or are likely to be, a cause of considerable discomfort to the occupant or occupants of the motor vehicle. Moreover, the occupant or occupants of the motor vehicle cannot anticipate and/or influence the timing and/or the extent of engagement or disengagement of the lockup clutch.

When a torque converter is used in the power train of a motor vehicle, its load factor or load value (LW) is a preselected parameter which is determined by the equation $LW = M_{pumpe}/n_{motor}^2$ wherein $M_{pumpe}$ is the torque of pump or impeller (hereinafter called pump) of the torque converter and n is the RPM of the internal combustion engine. Thus, the load factor LW is a function of the design and of the dimensions of the torque converter. It has been found that the fixed or predetermined load factor is or can be detrimental or can exert an undesirable influence upon the operation of the motor vehicle under certain circumstances of use including the velocity of the motor vehicle and/or the RPM ratios.

Accordingly, there exists an urgent need for power trains with improved hydrokinetic torque converter—lockup clutch combinations.

OBJECTS OF THE INVENTION

An object of the invention is to provide a power train which employs a hydrokinetic torque converter with a lockup or bypass clutch and is constructed, assembled and controlled in such a way that it enhances the comfort to the occupant or occupants of the motor vehicle in spite of its relative simplicity, compactness and low cost.

Another object of the invention is to provide a power train wherein the presence of the hydrokinetic torque converter and the associated lockup clutch does not entail the development of unexpected, pronounced and highly uncomfortable abrupt changes in the behavior of the motor vehicle and/or its power train.

A further object of the invention is to provide a novel and improved torque converter—lockup clutch combination for use in the power train of a motor vehicle.

An additional object of the invention is to provide a novel and improved control system for the hydrokinetic torque converter and the lockup clutch in the power train of a motor vehicle.

Still another object of the invention is to provide a novel and improved method of controlling the operation of a hydrokinetic torque converter and lockup clutch assembly in the power train of a motor vehicle.

A further object of the invention is to provide a power train which employs a hydrokinetic torque converter—lockup clutch combination and is more versatile than heretofore known power trains of such character.

Another object of the invention is to provide a power train which can automatically respond to a plurality of changes in the mode of operation of the motor vehicle to thus reliably prevent the discomfort experienced by the occupant or occupants of motor vehicles employing power trains with conventional hydrokinetic torque converter—lockup clutch combinations.

An additional object of the invention is to provide a novel and improved method of preventing abrupt changes in the behavior or mode of operation of a motor vehicle due to the presence of a hydrokinetic torque converter—lockup clutch combination in its power train.

Still another object of the invention is to provide a novel and improved method of regulating the timing and/or the extent of engagement and disengagement of the lockup clutch in the housing of a hydrokinetic torque converter forming part of the power train in a motor vehicle.

A further object of the invention is to provide novel and improved operative connections between the braking, fuel admission regulating and/or RPM monitoring system(s) and the control system for the hydrokinetic torque converter—lockup clutch combination in the power train of a motor vehicle.

SUMMARY OF THE INVENTION

One feature of the present invention resides in the provision of a fluid-operated hydrokinetic torque converter for use in a power train of a motor vehicle. The improved torque converter comprises a fluid-containing housing which is rotatable about a predetermined axis, means for connecting the housing to a rotary output element of a prime mover forming part of the power train and having idle and running conditions, a rotary output element which is coaxial with the housing, means for transmitting torque between the housing and the input element along a first path, and means for transmitting torque between the housing and the input element along a second path. The means for transmitting torque along the second path comprises an engageable and disengageable lockup clutch, and the torque converter further comprises control means including means for supplying fluid to the torque converter and means for at least partially engaging the lockup clutch while the motor vehicle is at a standstill and the prime mover is running so that a first torque is being transmitted between the housing and the input element along the first path and a second torque is being transmitted between the housing and the input element along the second path.

The means for transmitting torque along the first path comprises an impeller or pump disposed in and rotatable with the housing, and a runner or turbine disposed in and rotatable with and relative to the housing and being non-rotatably connected with the input element. The torque converter can further comprise a stator which is disposed in the housing between the pump and the turbine (as seen in the direction of the predetermined axis), a change-speed transmission which includes the input element and further includes a casing or case, and means for connecting the stator to the case. Actually, the change-speed transmission is part of the power train.

The control means can comprise means for receiving signals from a brake actuating device which is arranged to be applied by the operator of the motor vehicle, and means for disengaging the lockup clutch (so that the transmission of torque along the second path is interrupted) in response to application of the brake by the operator.

It is also possible to design the control means in such a way that it comprises means for receiving signals from the brake actuating device and means for reestablishing the transmission of torque along the first path and for disengaging the lockup clutch (so that the transmission of torque along the second path is interrupted) in response to an interruption of the application of the brake by the operator of the motor vehicle.

The lockup clutch can be designed to be fully engageable as well as to be partially engageable (it then operates with slip), and the control means can include means for receiving signals from the brake actuating device and means for partially engaging the lockup clutch in response to the application of the brake actuating device by the operator of the motor vehicle.

The lockup clutch can be designed to be engageable to operate with higher and lower degrees of slip, and the control means for the torque converter embodying or cooperating with such lockup clutch can comprise means for receiving signals from the brake actuating device and means for engaging the lockup clutch in response to an interruption of the application of the brake by the operator so that the lockup clutch is operated with a lower degree of slip.

Still further, the control means can include means for receiving signals from a fuel supplying device (such as a gas pedal) which is arranged to be actuated by the operator of the motor vehicle to start the vehicle, and means for at least partially engaging the lockup clutch in response to actuation of the fuel supplying device to start the motor vehicle. Such lockup clutch can be designed to be partially engageable to operate with slip, and the aforementioned means for at least partially engaging the lockup clutch in response to the actuation of the fuel supplying device to start the motor vehicle can be arranged to partially engage the lockup clutch so that the clutch operates with slip.

The just discussed control means can further comprise means for receiving signals from the brake actuating device, and the aforementioned means for at least partially engaging the lockup clutch in response to the actuation of the fuel supplying device can be arranged to at least initially reduce the slip of the lockup clutch (when the brake actuating device is not applied) as a function of at least one of (a) time, (b) the RPM of the input element and (c) the RPM of an output element of the transmission which includes the input element.

The means for at least partially engaging the lockup clutch in response to the actuation of the fuel supplying device can be arranged to at least initially increase the transmission of torque along the second path by way of the lockup clutch from zero to a preselected value as a function of (a) time, (b) the RPM of the input element and (c) the speed of the motor vehicle. The preselected value can be variable as a function of at least one of the aforementioned speed of the motor vehicle and the aforementioned RPM of the input element.

The control means can also comprise means for receiving signals from the brake actuating device and means for reducing the magnitude of the torque being transmittable along the second path in response to the application of the brake actuating device.

If the control means comprises means for receiving signals from the brake actuating device, it can comprise means for reducing the extent of engagement of the lockup clutch for the transmission of a predetermined minimum torque as a function of at least one of (a) the RPM of the input element and (b) the speed of the motor vehicle in response to the application of the brake actuating device by the operator of the motor vehicle. The arrangement can be such that the predetermined minimum torque is reached when the speed of the motor vehicle is zero or close to zero.

If the input element forms part of a shiftable change-speed transmission, the means for at least partially engaging the lockup clutch can be set up to be effective during shifting of the transmission into a selected gear.

Another feature of the invention resides in the provision of a fluid-operated hydrokinetic torque converter for use in the power train of a motor vehicle. The torque converter comprises a fluid-containing housing which is rotatable about a predetermined axis, means for connecting the housing to a rotary output element of a prime mover forming part of the power train (e.g., to the rotary camshaft or crankshaft of an internal combustion engine), a rotary input element which is coaxial with the housing, and means for transmitting torque between the housing and the input element along a first path. Such torque transmitting means comprises an impeller or pump which is disposed in and is rotatable with the housing, a turbine or runner which is disposed in and is rotatable with and relative to the housing and is connected to the input element, and a stator which is disposed in the housing between the turbine and the pump, as seen in the direction of the predetermined axis. The pump has an outer wall which is remote from the turbine and the turbine has an outer wall which is remote from the pump (all as considered in the direction of the predetermined axis). The turbine, the pump and the stator together form a toroidal structure (hereinafter called torus) having a width (as measured radially of the predetermined axis) and a length (as measured in the direction of the predetermined axis), and the ratio of the length to width of the torus is not more than 0.65. Such torque converter further comprises means for transmitting torque between the housing and the input element along a second path and including an engageable and disengageable lockup or bypass clutch, and control means including means for supplying fluid to the torque converter.

The aforementioned length-to-width ratio need not exceed 0.6 and can be between about 0.4 and 0.6, particularly between about 0.5 and 0.55.

The torus includes a first portion which is nearer to and a second portion which is more distant from the predetermined axis, and the aforementioned length is the length of the first portion of the torus.

In accordance with a presently preferred embodiment, the torus can be designed and dimensioned in such a way that it includes a first portion disposed at a first distance from the predetermined axis, a second portion disposed at a greater second distance from the predetermined axis, and a third portion disposed at a third distance from the predetermined axis. The third distance can be between 20% and 40% of the difference between the first and second distances, and the aforementioned length is the length of the third portion of the torus. In accordance with one presently preferred embodiment, the third distance is between about 25% and 35% of the difference between the first and second distances.

The novel features which are considered as characteristic of the invention are set forth in particular in the appended claims. The improved power train itself, however, both as to its construction and the modes of operating its hydrokinetic torque converter and lockup clutch, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
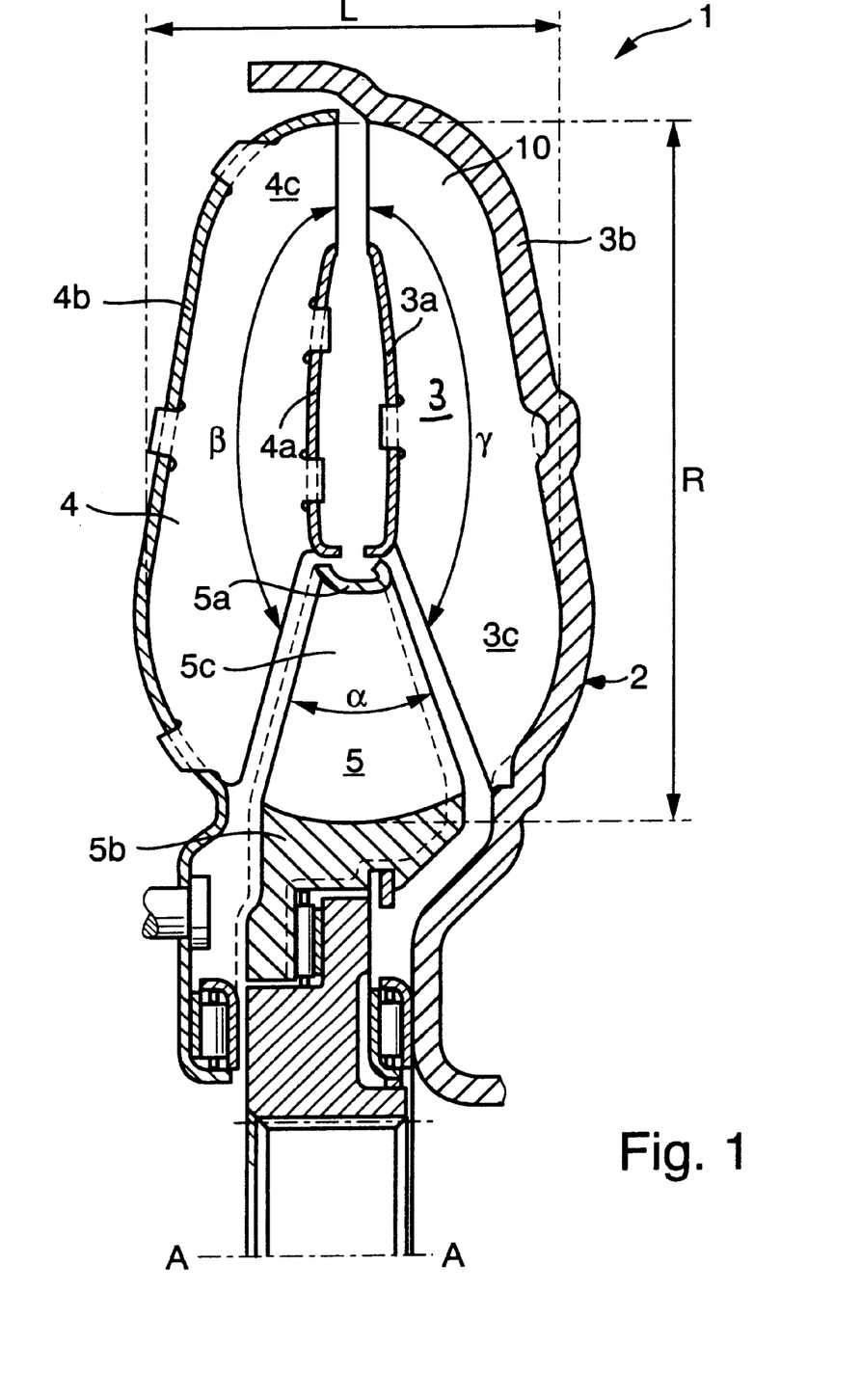
FIG. 1 is a fragmentary axial sectional view of a torque converter which can be utilized in a power train embodying one form of the present invention.

FIG. 1 shows a portion of a hydrokinetic torque converter 1 which can be put to use in the power train of a motor vehicle, e.g., to transmit torque between the rotary output element of a prime mover (such as the camshaft or crankshaft of an internal combustion engine in a passenger car) and the rotary input element of a driven assembly (such as the input shaft of a manually or automatically shiftable change-speed transmission having an output shaft arranged to drive a differential for the axles of the front or rear wheels in the motor vehicle).

The torque converter 1 comprises a fluid-containing housing 2 rotatable about an axis A—A and being connectable to the output element of the prime mover, e.g., in a manner to be described in greater detail with reference to FIG. 2.

The housing 2 contains and is shown as being of one piece with a pump or impeller 3, i.e., the latter is compelled to share all rotary movements of the housing about the axis A—A. The pump 3 comprises a first shell or wall 3a which is spaced apart from the housing 2, a second shell or wall 3b which is or can be of one piece with or is rigidly affixed to the right-and wall or section of the housing, and an annular set of blades or vanes 3c between the shells 3a, 3b. The vanes 3c impel or establish a circulating flow of fluid (such as oil) when the housing 2 is driven by the prime mover of the power train of the motor vehicle. The fluid flow serves to rotate the blades or vanes 4c of the turbine or runner 4 which is installed in the housing 2 and is non-rotatably connected to a hub (corresponding to the hub 163 shown in FIG. 2) which can transmit torque to the rotary input element of a shiftable change-speed transmission in the power train of the motor vehicle. The turbine 4 further comprises an inner shell or wall 4a which confronts the shell 3a of the pump 3, and an outer shell or wall 4b which is remote from the shell 3a. When the torque converter 1 is driven by the output element of the prime mover, it can transmit torque from the prime mover to the input element of the transmission along a (first) path defined by the housing 2, pump 3, the circulating body of fluid in the housing, and the turbine 4.

Still further, the torque converter 1 preferably comprises a stator 5 which is disposed between the radially inner portions of the pump 3 and turbine 4 and comprises a radially outer shell or wall 5a adjacent the shells 3a, 4a, a radially inner shell or wall 5b nearer to the axis A—A, and an annulus of vanes or blades 5c between the shells 5a, 5b. The radially inner shell 5b of the stator 5 can be connected with the case of the transmission which has an input element driven by the turbine 4 when the prime mover drives the housing 2 and the transmission of torque to the input element of the transmission takes place by way of the pump 3, the circulating body of fluid in the interior of the housing and the turbine 4.

The radially inner portions of the pump 3 and turbine 4 are or can be at least substantially mirror symmetrical to each other with reference to a plane which is normal to the axis A—A and halves the stator 5.

The power train which embodies the hydrokinetic torque converter 1 of FIG. 1 further comprises a so-called lockup or bypass clutch (hereinafter called lockup clutch) which corresponds to the lockup clutch 102 of FIG. 2 and (when at least partially engaged) serves as part of a means for transmitting torque between the output element of the prime mover and the input element of the transmission along a second path defined by the housing 2, the lockup clutch, the turbine 4, the hub of the turbine and the input element of the transmission.

The operation of the hydrokinetic torque converter 1 and its associated lockup clutch is regulated by an electronic control system one embodiment of which is shown in and will be described with reference to FIG. 2. The control system comprises at least one memory and a set of inputs for signals from various sensors including, for example, sensors for monitoring the RPM of the output element of the prime mover, the RPM of the input element of the transmission, the position of the brake actuating means, the speed of the motor vehicle (e.g., the RPM of the aforementioned wheels), the operation of an arrangement (such as a sump, a pump, one or more valves, conduits, filters and other parts) for regulating the flow of fluid into and from the housing 2) and others.

The fluid in the housing 2 is normally oil or an automatic transmission fluid (ATF).

The pump 3, the turbine 4 and the stator 5 together form a torus 10 which confines the body of fluid that circulates when the housing 2 is driven and completes the first path for the transmission of torque from the prime mover to the transmission by way of the housing 2, the vanes 3c, the vanes 5c and the vanes 4c.

The torus 10 is shown in FIG. 1 in a so-called axial or meridian cross-sectional view and has a width R (as measured radially of the axis A—A) and a length L (as measured in the direction of the axis A—A). The width R is measured between the radially inner portions of the vanes 5c of the stator 5 and the radially outer portions of the vanes 3c, 4c of the pump 3 and turbine 4. The axial length L is measured between the mutually remotest portions of the outer shells 3b and 4b of the pump 3 and turbine 4.

In accordance with a feature of the invention, the ratio L/R is 6.5/11=approximately 0.59. The presently preferred ratio L/R does not exceed 0.65 and is normally less than 0.6, preferably between about 0.5 and 0.6 (most preferably about 0.55).

FIG. 1 further shows that the maximum axial length L is nearer to the radially inner than to the radially outer portion of the torus 10, i.e., within the radially inner half of the torus. As a rule, the maximum length L is located within the range of between 20% and 40% of the torus 10 as measured from the radially inner portion, especially between 25% and 35%. Since the shells 3b and 4b have arcuate shapes and are or can be substantial mirror images of each other, the torus 10 has a substantially pear-shaped cross-sectional outline and tapers gradually from the portion of maximum axial length L in directions radially inwardly toward as well as radially outwardly away from the axis A—A. The radially outer portion of the torus 10 is narrower than the radially inner portion.

The outer shells 3b, 4b of the pump 3 and turbine 4 are configured in such a way that they have portions which are located radially outwardly of the locus of maximum width L and are at least substantially parallel to each other. These substantially parallel portions of the shells 3b, 4b are flanked by that portion of the interior of the housing 2 wherein the fluid flow is deflected due to the curvature of the outer shells 3b, 4b.

It is further advisable to design the hydrokinetic torque converter 1 in such a way that the inner shells 3a, 4a, 5a of the pump 3, turbine 4 and stator 5 define a core region which is not located centrally between the radially inner and radially outer portions of the torus 10. In FIG. 1, the core is nearer to the radially outer portion of the torus 10. Otherwise stated, the width of the torus 10 as measured radially of the core defined by the shells 3a, 4a, 5a is less than the width of the torus radially inwardly of such core. Furthermore, it is advisable to select the configuration or outline of the radially outermost portion of the torus 10 (radially outwardly of the shells 3a, 4a, 5a) in such a way that it comprises two halves which are at least nearly mirror symmetrical to each other relative to a plane normal to the axis A—A. In the embodiment of FIG. 1, the length of the torus 10 (as measured in the direction of the axis A—A) decreases gradually (linearly) from the portion of maximum axial length L and radially outwardly away from the axis A—A (along the shells 3a and 4a). Thus, the axial length of the just discussed portion of the torus 10 decreases linearly with the increase of its width as measured radially of the axis A—A toward the portion of maximum width R.

Figure 2:
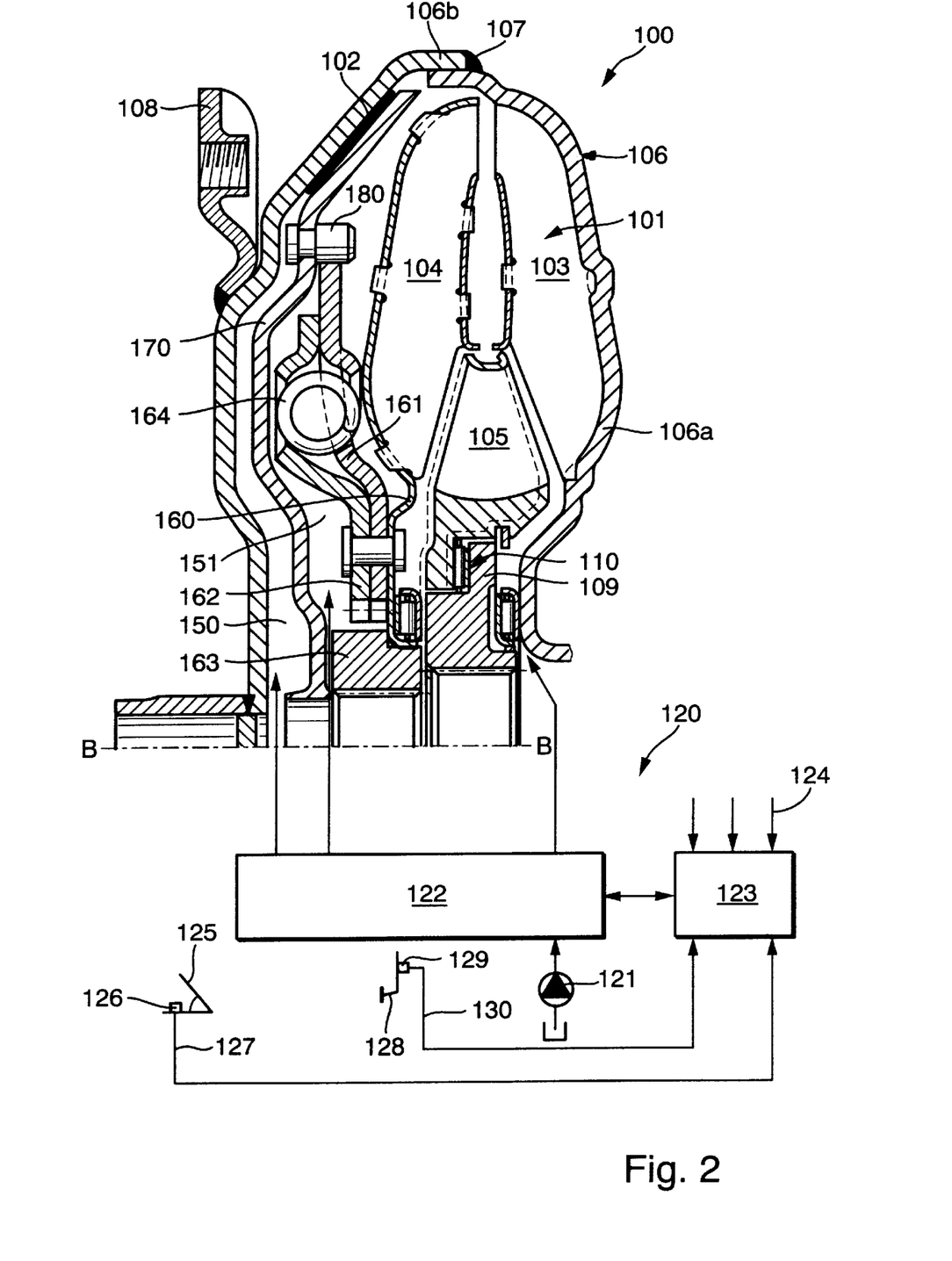
FIG. 2 is a fragmentary partly schematic and partly axial sectional view of a power train embodying a hydrokinetic torque converter analogous to that shown in FIG. 1.

FIG. 2 shows a power train 100 which comprises a hydrokinetic torque converter 101 having a housing 106 provided with annular means 108 for connecting it to the rotary output element of a prime mover (such as the aforementioned camshaft or crankshaft of an internal combustion engine). The means for connecting the housing 106 to the output element of the prime mover preferably further comprises a flexible disc-shaped plate having a radially outer portion affixed to the connecting means 108 by bolts, rivets or the like, and a radially inner portion affixed to the output element of the prime mover. Reference may be had, for example, to commonly owned U.S. Pat. No. 5,377,796 granted Jan. 3, 1995 to Oswald Friedmann and Johann Jäckel for "APPARATUS FOR TRANSMITTING FORCE BETWEEN ROTARY DRIVING AND DRIVEN UNITS". The disclosure of each U.S. and each foreign publication identified in this specification is to be considered as being incorporated herein by reference.

The power train 100 of FIG. 2 further comprises the aforementioned lockup clutch 102 which, when so determined by an electronic control system 120 of the power train 100, can transmit torque from the prime mover, via housing 106, a torsional vibration damper having an annulus of energy storing elements 164, the turbine or reactor 104 of the torque converter 101, the hub 163 of the turbine, and to the rotary input element of the change-speed transmission. The control system 120 regulates the operation of the torque converter 101 as well as the operation of the lockup clutch 102 in a novel and improved way.

The control system 120 comprises or regulates the operation of means for supplying fluid to the torque converter 101, and such supplying means comprises a pump 121 connected to a suitable source of fluid, such as a sump, as well as a hydraulic block 122 which comprises one or more valves such as proportionating, directional control, distributing, on-off, pressure reducing and/or throttle valves as well as conduits for the flow of fluid to, between and from the components of the block 122. One mode in which a valve block or a differently configured array of valves can regulate the flow of fluid to and from a hydrokinetic torque converter embodying or cooperating with a lockup clutch is disclosed, for example, in U.S. Pat. No. 5,553,694 granted Sep. 10, 1996 to Winfried F. Schulz et al. for "MULTIPLE RATIO AUTOMATIC TRANSMISSION AND TORQUE CONVERTER".

The control system or unit 120 further comprises an electronic circuit 123 with a microcontroller and inputs 124 for signals from various constituents of the motor vehicle and its power train 100. The circuit 123 processes the incoming signals and causes the pump 121 and valve block 122 to regulate the flow of fluid to and from the torque converter 101 in accordance with the method of the present invention. The signals at the inputs 124 and other incoming signals enable the control unit 120 to monitor the condition and the mode of operation of the motor vehicle and its power plant 100. For example, the inputs 124 can receive signals from a speedometer which furnishes information pertaining to the momentary speed of the motor vehicle, from a sensor which monitors the RPM of the output element of the prime mover (such as the RPM of the housing 106), from a sensor which monitors the RPM of the input element of the transmission (e.g., the RPM of the hub 163), the RPM of the rotary component of the pump 121 and/or others. Reference may be had again to the aforementioned U.S. Pat. No. 5,553,694 to Winfried F. Schulz et al.

Furthermore, the circuit 123 comprises an input for signals from a gas pedal 125. The position of this gas pedal (fuel supplying device) is monitored by a sensor 126 which is connected to the corresponding input of the electronic circuit 123 by a conductor 127. A brake actuating device 128 (e.g., a pedal) is monitored by a sensor 129 which transmits appropriate signals to the corresponding input of the circuit 123 by way of a conductor 130.

The three inputs 124 are assumed to receive signals from the aforementioned speedometer, from the aforementioned device which monitors the RPM of the output element of the prime mover, and from the aforementioned device which monitors the RPM of the input or output element of the change-speed transmission in the power train 100.

The lockup clutch 102 has a piston 170 which is movable axially of the torque converter 101 and is installed in the housing 106 adjacent the left-hand wall 106b of the latter between two plenum chambers 150, 151. When the valve block 122 causes the fluid pressure in the chamber 151 to rise above that in the chamber 150, the lockup clutch 102 is at least partially engaged in that the customary friction lining on the frustoconical radially outermost portion of the piston 170 bears against the adjacent friction lining or friction surface on a conical portion of the wall 106b of the housing 106 so that at least some torque can be transmitted between the prime mover and the input element of the change-speed transmission along a second path defined by the connecting means 108, the wall 106b, piston 170, a connection 180 between the piston 170 and a washer-like input element 161 of the torsional vibration damper including the preferably annular array of preferably arcuate energy storing elements 164, the output member 162 of the damper, and the hub 163. The valve block 122 can regulate the changes of fluid pressure in the plenum chambers 150, 151 with a very high degree of accuracy so that the partial engagement of the lockup clutch 102 can take place with a desired degree of slip including zero slip.

In accordance with a feature of the invention, the control system or unit 120 is set up to ensure that the lockup clutch 102 is at least partially engaged (i.e., so that it transmits at least some torque along the aforementioned second path) while the prime mover is running (i.e., while the housing 106 rotates) but the motor vehicle is at a standstill (i.e., while the RPM of the vehicle wheels is still zero). At such time, the torque converter 101 transmits torque along the first path via housing wall 106b, a welded seam 107 between the wall 106b and the other (right-hand) housing wall 106a, the pump 103, a body of fluid in the torus including the pump 103, the turbine 104 and the stator 105, and the hub 163. At the same time, some torque is being transmitted along the aforementioned second path which is defined in part by the lockup clutch 102 but bypasses the wall 106a, the pump 103, the body of fluid in the torus and the stator 105.

The pump 103 can be of one piece with the wall 106a of the housing 106. The welded seam 107 establishes a fluidtight seal at the radially outermost portion of the torus which is or which can be similar or analogous to the aforedescribed torus 10 of FIG. 1. The stator 105 is mounted on a hub 109 by way of a freewheel 110 which causes the stator to rotate with the hub 109 in one direction but permits the stator to rotate relative to the hub 109 in the opposite direction.

The shell or casing 160 of the turbine 104 is at least substantially fixedly connected to the input member 161 of the torsional vibration damper. The output member 162 of the damper is non-rotatably affixed to the hub 163 which, in turn, is non-rotatably secured to the rotary input element of the transmission. The energy storing elements 164 are normally arcuate coil springs which store energy when the input and output members 161, 162 of the torsional vibration damper are caused to turn relative to each other from their neutral or starting positions.

The friction lining of the piston 170 of the lockup clutch 102 is preferably grooved, channeled or otherwise configurated in a manner as disclosed, for example, in commonly owned U.S. Pat. No. 5,738,198 granted Apr. 14, 1998 to Ernst Walth and Georg Weidner for "FRICTION ELEMENT FOR USE IN CLUTCHES", or in commonly owned U.S. Pat. No. 5,782,327 granted Jul. 21, 1998 to Dieter Otto and Volker Middlemann for "HYDROKINETIC TORQUE CONVERTER AND LOCKUP CLUTCH THEREFOR". Such configuration of the friction lining permits the flow of coolant between the chambers 150, 151, even when the lockup clutch 102 is fully engaged. A second friction lining can be provided on the wall 106b, or the lockup clutch 102 can comprise a single friction lining which is provided on the wall 106b and cooperates with a friction surface of the piston 170.

The illustrated lockup clutch 102 can be replaced with a clutch wherein the torque transmitting portion of the piston, the friction lining(s) and the torque transmitting portion of the wall 106b of the housing are located in parallel planes which are at least substantially normal to the axis B—B.

The torque transmitting connection 180 between the piston 170 and the radially outermost portion of the input element of the torsional vibration damper can comprise an annular array of bolts, rivets or other suitable fasteners.

Figure 3:
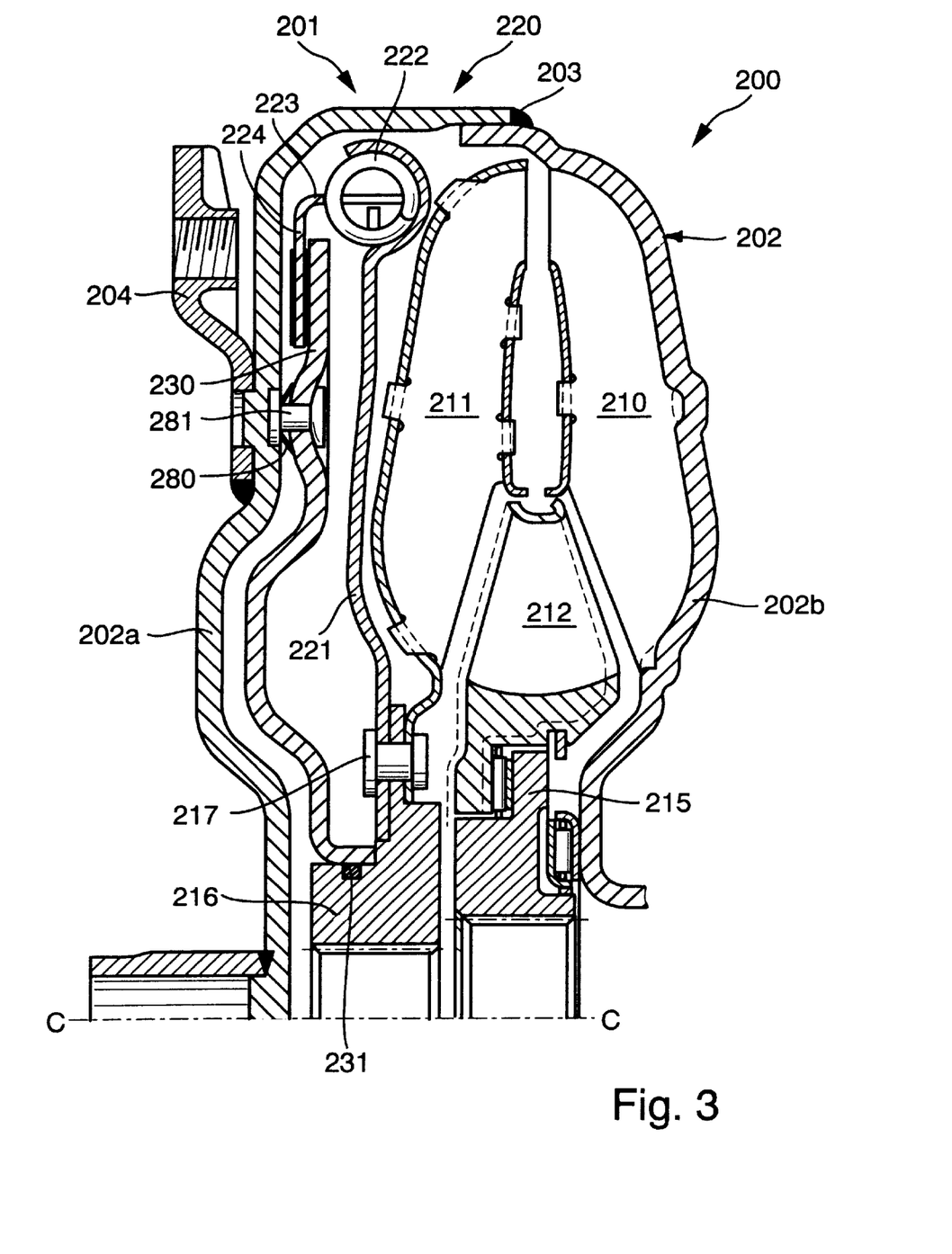
FIG. 3 is a fragmentary axial sectional view of a hydrokinetic torque converter—lockup clutch combination constituting a modification of the combination employed in the power train of FIG. 2.

FIG. 3 shows a portion of a modified power train employing a hydrokinetic torque converter 200 and a lockup clutch 201. The torque converter 200 comprises a rotary housing 202 including a wall 202a which is adjacent the prime mover (not shown) and a second wall 202b welded (at 203) to the wall 202a to establish a fluidtight seal for the fluid in the interior of the housing. The wall 202a is provided with discrete connectors 204 (or with a circumferentially complete connector) serving to secure the housing 202 to the rotary output element of the prime mover, e.g., in a manner as described with reference to FIG. 2 and as shown in U.S. Pat. No. 5,377,796.

The torque converter 200 further comprises a pump or impeller 210, a turbine 211 and a stator 212. The pump 210 is affixed to or is of one piece with the wall 202b of the housing 202. The stator 213 is mounted on a hub 215 which is coaxial with the rotary input element of the transmission (not shown).

The turbine 212 is connected for rotation with a hub 216 by one or more rivets 217, welded seam(s) or in any other suitable way. A torsional vibration damper 220 is installed in the housing 202 between the turbine 212 and the axially movable piston 230 of the lockup clutch 201. This damper comprises a substantially disc-shaped input member 221 having a radially outer portion with arcuate pockets for portions of energy storing elements 222 in the form of coil springs. A washer-like member 224 of the damper 220 has axially parallel extensions or arms 223 which extend between the end convolutions of the neighboring coil springs 222. The member 224 carries friction linings and is adjacent the radially outer portion of the piston 230 so that the lockup clutch 201 is engaged when the piston 230 is caused to urge the friction lining against the adjacent annular friction surface of the wall 202a. Leaf springs 280 and rivets 281 are provided to at least substantially non-rotatably connect the piston 230 to the wall 202a in such a way that the piston has adequate freedom of movement in the direction of the axis C—C of the power train including the structure of FIG. 3.

The substantially I-shaped radially inner portion of the piston 230 is rotatably and axially movably mounted and centered on the hub 216 and engages a sealing element 231 (e.g., an O-ring) which is recessed into the peripheral surface of the adjacent portion of the hub 216.

A hydrokinetic torque converter—lockup clutch combination (such as that shown in FIG. 3) can be utilized with particular advantage as a starter unit for a continuously variable transmission (CVT), e.g., a transmission of the type disclosed in commonly owned U.S. Pat. No. 5,679,091 granted Oct. 1, 1997 to Michael Salecker et al. for "METHOD OF AND APPARATUS FOR REGULATING THE TRANSMISSION OF TORQUE IN POWER TRAINS". However, such torque converter—lockup clutch combination can be utilized with equal or similar advantage in power trains which employ manually shiftable or automated change-speed transmissions (reference may be had to FIG. 16 of the aforementioned U.S. Pat. No. 5,679,091 to Michael Salecker et al). It has been found to be of particular advantage to employ a so-called soft hydrokinetic torque converter with a torque conversion factor greater than, for example, 2.5 and with a control system or unit embodying the present invention. Such combination is desirable in order to ensure a highly satisfactory regulation of the starting of a motor vehicle. The soft torque converter furnishes the minimum torque which is necessary to ensure that the initial movement of the motor vehicle is a crawling movement (without an actuation of the gas pedal) or to ensure a setting in motion (with actuation of the gas pedal). If it is desired to achieve a "harder" starting (setting in motion) of the motor vehicle, it is possible to simply initiate the transmission of a certain additional torque by way of the lockup clutch 102 or 201, i.e., the substitue load factor or load value LW of the hydrokinetic torque converter—lockup clutch combination is then augmented or increased, starting from the load factor or load value of the "open" torque converter (the term "open" is intended to denote that the torque converter does not transmit torque along the first path including the parts 106, 103, 104, 105 of FIG. 2 or the parts 202, 210, 211, 212 of FIG. 3), by the load factor or load value of the lockup clutch 102 or 201 which can be engaged to operate with slip already while the motor vehicle is still motionless.

An advantage of an arrangement utilizing a normally, or when necessary, soft torque converter—lockup clutch combination is that this renders it possible, for example, to vary and regulate the starting behavior and the crawling speed of the motor vehicle, depending on the selection of torque to be transmitted by the lockup clutch. For example, the crawling or starting behavior of the motor vehicle can essentially match that which is achieved with a power train not employing a torque converter, i.e., with a power train which merely employs a friction clutch as a means for transmitting torque between the output element of the prime mover and the input element of a manual, partly manual or automated transmission. Still further, it is possible to regulate in a manner similar to that which is carried out by employing a soft torque converter and the lockup clutch disengaged, i.e., it is possible to impart to the motor vehicle a crawling or smooth starting movement with a very high conversion factor. Since, as a rule, the torque converter takes up a portion of the starting torque, the extent of lost output at the lockup clutch is less than in the region of a clutch with a starting element without a torque converter.

If the torque $M_{kupp}$ which can be transmitted by the lockup clutch is selected as a constant value (in comparison with the engine torque $M_{mot}$ (KME value)), the torque converter (such as 200) and its associated lockup clutch (201) can be put to use to serve as a novel "substitute" torque converter.

As the aforementioned KME value increases, this entails changes of characteristic parameters of the hydrokinetic torque converter—lockup clutch combination. The progress or variation of the load factor LW can be planned to take place in a direction toward an increase by the expedient of changing the KME value. However, this always entails a reduction of torque conversion and efficiency. On the other hand, a hydrokinetic torque converter—lockup clutch combination, combined with the novel regulation of torque being transmittable by the lockup clutch, brings about the unexpected advantage that the characteristic of the torque converter can be modulated in a planned manner, for example, as a function of time, of the RPM ratio(s) of the position of the gas pedal, and/or of the RPM of the output element of the prime mover. For example, the load value or load factor LW can be altered in a planned manner while the turbine (such as 104 or 211) is at a standstill (stall point). This renders it possible to proceed (in accordance with the invention) as follows:

(a) lower the load factor LW while the motor vehicle is at a standstill to thus reduce the fuel consumption;

(b) regulate the load factor LW to thus regulate the crawling torque;

(c) regulate the load factor as a function of the engine RPM, for example, in order to achieve a constant starting RPM while the vehicle is being set in motion.

As long as the aforementioned value KME is less than one, the torque converter is compelled to take up a certain pump torque. Thus, there develops in the torque converter a certain slip RPM. However, if the designer of the power plant desires to select a zero slip while the motor vehicle is being started, the KME value must be selected or set to equal or exceed one.

If the actuation of the lockup clutch 102 or 201 entails the establishment of an additional load factor $M_K=LW_K*n_e^2$ (namely in addition to the actual load factor of the torque converter 101 or 200), there develops an offset or an additive contribution to the load factor progress of the torque converter. Consequently, the overall system (the hydrokinetic torque converter—lockup clutch combination) transmits a torque $M_U=LW_K*n_e^2$ even at the synchronization point. If such torque is less than at the output of the prime mover, the lockup clutch operates with slip. On the other hand, the lockup clutch operates without slip if the torque $M_U$ is greater than the torque at the output element of the prime mover. Since the load factor decreases toward the synchronization point, a wear effect develops based on the progress of the RPM of the output element of the prime mover. At such time, the progress of torque conversion and the efficiency of operation equal or approximate the previously described. For example, if one desires to take advantage of full torque conversion at a maximum load, and if the ratio between the turbine RPM and the pump RPM is small or relatively small, it is possible to drive the motor vehicle with the torque converter ineffective and with the lockup clutch engaged between the clutch- and synchronization points of the torque converter. If the characteristic field of the prime mover has downwardly sloping gas pedal characteristic curves (i.e., characteristic curves of torque at a given position of the gas pedal 125), the lockup clutch can be fully engaged before the clutch point is reached.

If the brake pedal 128 is depressed while the motor vehicle is at a standstill, the control unit 120 effects a full disengagement of the lockup clutch 102. If the operator of the motor vehicle releases the brake pedal 128 (i.e., if the brake is no longer applied), the control unit 120 partially engages the lockup clutch 102 so that the latter transmits a minimal or negligible or zero torque (e.g., in the range of between 0 and 5 Nm). Thereafter, the torque (clutch torque) which the lockup clutch can transmit increases as a function of time, depending upon the RPM of the input element of the transmission or the speed of the motor vehicle until the torque rises to a maximum value $M_K(V)$ which, in turn, is again a function of the speed of the motor vehicle. If the operator actuates the gas pedal 125, this entails the establishment (by the control unit 120) of that torque (clutch torque) which the lockup clutch can transmit for regulation of the setting in motion of the motor vehicle. On the other hand, if the operator of the motor vehicle actuates the brake pedal 128, the creep or crawling torque decreases to a minimum value as a function of the RPM of the input element of the transmission or the speed of the motor vehicle. If the vehicle is at a standstill or is about to come to a halt, the magnitude of the torque is close to or matches the minimum value. The lockup clutch is again fully disengaged when the motor vehicle comes to a halt. If the (brake)

signal from the sensor 129 via conductor 130 is defective, or if one desires to prevent the development of a closing or engaging pressure, it is possible or desirable to ensure that the lockup clutch is always set to transmit a rather small or minimal torque.

Since the lockup clutch torque is being transmitted in addition to that of the pump of the torque converter (such as 101 or 200), the application of a certain torque invariably entails an increase of the substitute load value of the torque converter—lockup clutch combination. Thus, a torque converter cooperating with an at least partially engaged lockup clutch acts as a "hard" or "harder" torque converter.

When the motor vehicle speed is zero or very low and the conductor 130 transmits a signal denoting that the brake pedal 128 is being applied, one can achieve a reduction of fuel comsumption by regulating the substitute load value of the power train (including a torque converter—lockup clutch combination) to a minimum possible value. This means that the torque (clutch torque) which the lockup clutch can transmit is set to zero or at a value close to zero, or the lockup clutch can be fully disengaged. An interruption of the application of the brake pedal 128 entails the generation (by the sensor 129) of a signal which is transmitted via conductor 130 and enables the control unit 120 to ascertain that the motor vehicle is in the process of carrying out a crawling movement if the gas pedal 125 is not depressed. The lockup clutch 102 or 201 can be disengaged in immediate response to actuation of the brake pedal 128. However, if it is desired to vary the output torque of the motor vehicle (e.g., to shunt o similarly manipulate the vehicle), the crawling torque is reduced only when the motor vehicle is in the process of coming to a gradual standstill.

The crawling or creeping torque of the motor vehicle (while the gas pedal 125 and the brake pedal 128 are not depressed) can be selected as a function of the speed of the motor vehicle and/or as a function of the RPM of the input element of the change-speed transmission. It is also possible to select a minimal crawling or creeping speed; however, such minimal crawling speed is limited in response to a limiting or curtailing of the maximum crawling torque. Signals denoting the speed of the motor vehicle and/or the RPM of the input element of the change-speed transmission can be utilized to realize or recognize that the motor vehicle has been brought to a halt and to reduce the magnitude of clutch torque; to this end, at least one of these parameters is compared in the circuit 123 with memorized information and, if the intensity or another characteristic of the signal denoting the speed of the motor vehicle and/or the RPM of the input element of the transmission is below the intensity or other characteristic of the memorized information, the control unit 120 effects a reduction of the torque which can be transmitted by the lockup clutch.

An advantage of the regulation of clutch torque as a function of time is that changes in the condition or setting of the torque converter—lockup clutch combination can be stretched out (i.e., prolonged in contrast to abrupt changes) to thus impose a time limit upon the duration of critical conditions of operation of the motor vehicle. Thus, it is often preferred to avoid an abrupt buildup of crawling or creep torque, i.e., the clutch torque is caused to increase from zero to crawling torque within a preselectable interval of time. Moreover, the length of the interval of starting of the motor vehicle can be limited to a function of time. If the permissible (desired or preselected) starting interval is exceeded, the lockup clutch is engaged or disengaged as a function of time.

Signals from the gas pedal sensor 126 and brake pedal sensor 129 are or can be processed by the electronic circuit 123 to ascertain an intent on the part of the operator of the motor vehicle, namely whether the operator desires to set the motor vehicle in motion, to decelerate the vehicle or to impart to the vehicle a crawling movement. Signals denoting the position of the gas pedal 125 can be processed by the control unit 120 to initiate a starting movement when the gas pedal 125 is depressed or to interrupt the vehicle starting procedure if the gas pedal is no longer depressed.

The space requirements of the relatively compact novel torque converter—lockup clutch combination (such as 101, 102 or 200, 201) are a rather small fraction of the space requirements of conventional circular designs. For example, the axial length L of the improved combination can be within the range of between at least 35% and more than 50% less than that of conventional combinations (normally within the range of between about 40% and 45%). Furthermore, additional important advantages of the improved hydrokinetic torque converter—lockup clutch combination are attributable to the aforedescribed novel control unit and method of controlling the transmission of torque along the two paths, particularly to the feature that the lockup clutch can be at least partially engaged before the motor vehicle is actually set in motion.

For the application of the improved compact hydrokinetic torque converter—lockup clutch combination in conjunction with continuously variable transmissions (CVT), e.g., those employing two adjustable pulleys and a torque-transmitting chain or belt trained over the pulleys, it is advantageous to resort to a controlling or regulating strategy involving an operation of the lockup clutch in such a way that one need not rely upon a discrete engagement or disengagement procedure or tactic for such clutch. Instead, one resorts to a regulating method of infinitely variable adjustment of the torque to be transmitted by the lockup clutch. Such novel infinitely variable adjustment of the torque which can be transmitted by the lockup clutch renders it possible to select a minimum (dragging) infinitely variable clutch torque of between 2 and 10 Nm while the motor vehicle is yet to be set in motion and as soon as the brake pedal 128 is released. The regulation is terminated when the engagement of the lockup clutch is completed, the vehicle is set in motion and the gas pedal 125 is depressed until the time of changing the ratio of the transmission.

An advantage of such strategy of infinitely regulating or varying the lockup clutch torque is that this enhances the comfort to the occupant(s) of the motor vehicle. This will be readily appreciated since the lockup clutch need not be engaged (because it is already engaged) a the time when the motor vehicle is being set in motion, i.e., the lockup clutch cannot cause any abrupt and hence unpleasant changes in the behavior and mode of operation of the motor vehicle and its power train. An advantage of a "soft" torque converter with a high starting or initial torque conversion and high applied-brake (stall) RPM, in comparison with "hard" torque converters, is that the standstill losses are lower and that its ability to effect a pronounced acceleration of the motor vehicle is greatly superior to that of "hard" torque converters. Furthermore, the so-called hot running stage of the combustion engine is shortened if the power train employs a "soft" torque converter—lockup clutch combination; this exerts a beneficial influence upon the quality of emitted combustion products.

However, it has been ascertained that certain stages of operation of the power train can entail relatively high torque conversion losses. Such losses can be compensated for or at least greatly reduced in that, when utilizing "soft" torque converters, one at least partially engages the lockup clutch in a manner and for the purposes as already described hereinbefore. Such at least partial engagement of the lockup clutch can take place in all gear ratios of the transmission and before the motor vehicle is set in motion. It is also desirable that the lockup clutch be at least partially engaged in each gear ratio of the transmission and within each RPM range. For example, and as also explained hereinbefore, the lockup clutch is or can be disengaged in response to the application of the brake pedal while the motor vehicle is at a standstill.

The advantages of the novel feature that the axial length (L in FIG. 1) of the improved torque converter—lockup clutch combination is kept to a very low value will be readily appreciated. Thus, the space under the hoods of numerous recent types of motor vehicles is at a premium. Moreover, the improved torque converter—lockup clutch combination is a simple and lightweight assembly which can be mass produced at a reasonable cost.

In order to minimize standstill losses, it is advisable to ensure that the load factor (LW) of the improved torque converter—lockup clutch combination at the fixed braking point (operation with stall) be kept as low as possible. On the other hand, engagement of a lockup clutch is more comfortable to the occupant or occupants of the motor vehicle if the load factor (LW) in the range of the clutch point is as high as possible. In addition, the selection of a high load factor entails a reduction of thermal stressing of the lockup clutch. Consequently, it is desirable and advantageous to ensure that the ratio of load factor at the fixed braking point and the load factor at the clutch point be as small as possible. It has been found that the improved torque converter—lockup clutch combination operates very satisfactorily if the axial length of the torus (such as the length L of the torus 10 shown in FIG. 1) is reduced as much as possible, i.e., if the maximum axial distance between the shells 3b, 4b shown in FIG. 1 is considerably less than in a conventional torus.

Still further, it is desirable to ensure that the cavitation of fluid within the torus be very low or non-existent. It has been ascertained that the operation of the improved torque converter—lockup clutch combination is highly satisfactory if the path for the circulation of fluid (as compared with a circular fluid flow and as measured in the axial direction of the housing of the torque converter) is reduced by between at least 35% and even more than 50%, preferably between 40% and 45%.

Elimination (or at least a substantial reduction) of cavitation is a highly desirable advantage of the improved torque converter—lockup clutch combination. Cavitation involves the development and subsequent collapse of gas bubbles in the fluid which circulates in the torus of the torque converter. Such phenomenon is eliminated or reduced to a minimum in that the intake or suction region of the pump 3, 103 or 210 (i.e., the region between the pump and the stator) is the lowermost-pressure locale in the housing. Furthermore, by reducing profile losses at the stator, one can maintain the static fluid pressure at the outlet of the stator at a maximum value.

As already mentioned hereinbefore, the highly desirable compactness of the improved hydrokinetic torque converter—lockup clutch combination renders it possible to achieve substantial savings in material. The stator (such as 5, 105 or 212) of the improved torque converter can be mass produced in an injection molding machine. The inner and outer shells of the pump and turbine (such as the shells 3a, 3b and 4a, 4b shown in FIG. 1) can be mass produced in a deep drawing or stamping machine and can be simultaneously provided with recesses or slots for the respective vanes or blades (such as 3c and 4c). At least some of the aforementioned hubs (such as 109, 163 or 215, 216) can be made of a sintered material.

The pathway for the circulation of hydraulic fluid in the torus (such as 10) of a hydrokinetic torque converter is determined by the ratio of the axial length (L) and the radial width (R) of the torus. As already pointed out hereinabove, it has been ascertained that a highly satisfactory L/R ratio is between about 0.6 and 0.4, particularly between 0.55 and 0.5. This has been found to entail a 25% to 30% reduction of space requirements of the structure including the hydrokinetic torque converter, the lockup clutch and the torsional vibration damper (as measured in the axial direction of the housing of the torque converter, i.e., as measured in the direction of axis A—A in FIG. 1, in the direction of axis B—B in FIG. 2, and in the direction of axis C—C in FIG. 3).

Each of FIGS. 1, 2 and 3 shows that the length of the stators 5, 105, 212 (as measured in the direction of the respective axes A—A, B—B and C—C) is quite pronounced when compared with the axial lengths of the respective housings 2, 106 and 202. The ratio of the axial length of a stator to the axial length of the respective housing can be in the range of between about 0.4 and 0.5.

In addition to the resemblance of the cross section of the torus (such as 10) to that of a pear, this cross section can also be said to resemble that of a droplet or a tulip. Irrespective of its greater resemblance to one of the aforementioned objects or things or plants, the improved torus exhibits a maximum axial length closer to its radially innermost than its radially outermost portion. The stator extends to or even radially beyond the torus portion of maximum axial length, and its length (e.g., as measured in the direction of the axis A—A) is increased with simultaneous reductions of the axial dimensions of adjacent portions of the pump and turbine. The axial length of the stator decreases in a direction radially outwardly, and such decrease is or can be gradual.

The vanes or blades (such as 5c) of the stator (such as 5) are preferably designed and dimensioned in such a way that the ratio between the length $L_S$ (see FIGS. 4 and 5) of a stator vane or blade and the spacing $A_S$ between neighboring vanes or blades (i.e., the so-called pitch ratio) is rather pronounced. It has been discovered that the novel torque converter operates highly satisfactorily if the ratio $L_S/A_S$ is approximately 1.2.

Figure 4:
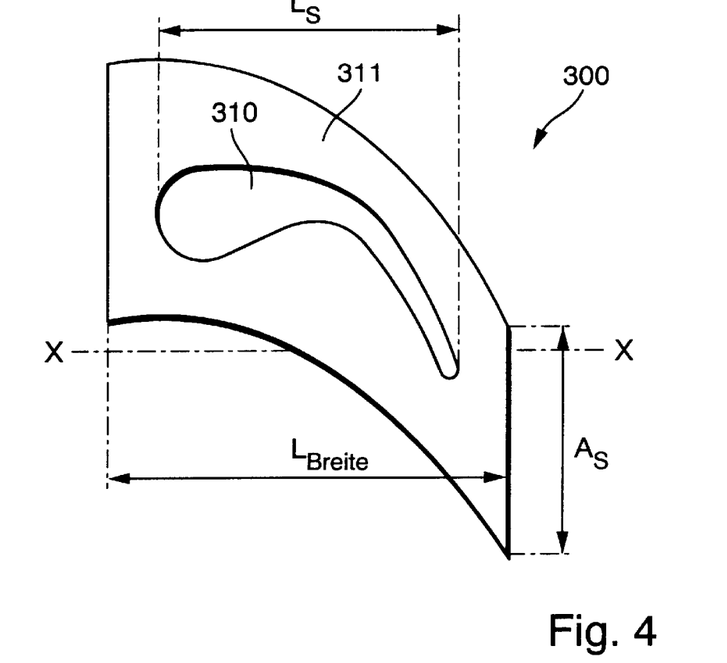
FIG. 4 shows a portion of a stator which can be utilized in the torque converter of the improved power train.

FIG. 4 shows the arrangement of certain vanes or blades 310 in a stator 300 which can be utilized in the improved torque converter. The vanes 310 are shown as being located in a common plane even though, in actual practice (i.e., in the torus of a torque converter), they are located on a cylindrical surface. In other words, FIG. 4 shows a developed view or projection of the stator in a plane.

The pear- or tulip-shaped torus of the hydrokinetic torque converter—lockup clutch combination of the present invention exhibits the aforementioned advantage that it can employ an axially expanded or enlarged stator as well as the advantage that the cross-sectional area of the three-dimensional fluid flow channel (as seen in a plane which is normal to the direction of fluid flow in the torus) can be maintained at least substantially at a constant value in the pump as well as in the turbine along the full length of such path. This renders it possible to avoid, or to at least greatly reduce, undesirable accelerations and/or decelerations of the fluid flow along the entire fluid path within the torus; this, in turn, renders it possible to avoid or to greatly reduce losses in the transmission of torque.

It is also within the purview of the invention to realize for the pump a contraction figure or value within a range of between 0.7 and 0.85, particularly about 0.8. The term contraction figure or value (or number) is intended to denote the ratio of the cross-section of fluid flow in the median region of a pump vane (such as 3c) to the cross-sectional area of fluid flow at the inlet and outlet of a pump vane. The 0.8 value of such contraction figure indicates that the cross-sectional area of fluid flow at the central or median region of the pump vane amounts to approximately 80% of the cross-sectional area at the inlet as well as at the outlet of the pump vane. An advantageous contraction value for the turbine is at or about 1.2, especially within the range of between about 1.15 and 1.25. Thus, the width of the turbine channel is greater at the middle (preferably within the first third) by approximately 20% and thereupon decreases to lesser values at the inlets and at the outlets of the turbine vanes.

Referring again to FIG. 1, the hydrokinetic torque converter 1 which is shown therein includes a stator 5 with radially outwardly convergent axial regions making an acute angle α. The obtuse angle β is defined by the radially innermost and radially outermost portions of the array of turbine vanes 4c, and the obtuse angle γ is defined by the corresponding portions of the set of pump vanes 3c. The angle α preferably equals or exceeds 30° and, therefore, each of the angles β, γ can be reduced from the range of between about 150° and 160° to about 120°.

Referring again to FIG. 4, the reference character 310 denotes a stator vane or blade, and the character 311 represents the area surrounding the vane 310 and having a width $L_{Breite}$. The vane 310 is but one of an annular array of such vanes which are separated from each other and together form a stator. The length $L_S$ of the vane 310 (as measured in the direction of the axis X—X of the corresponding torque converter) amounts to between about 75% and 80% of the overall width $L_{Breite}$ of the stator. In FIG. 4, the vane 310 is shown in section in a position close to the radially outer stator hub. The distance of the vane 310 from the outer hub is determined by the outer zones of the area 311 because these areas are repeated, the same as the vanes 310. Such distance and the lengths of the stator vanes furnish a pitch greater than 1.2.

Figure 5:
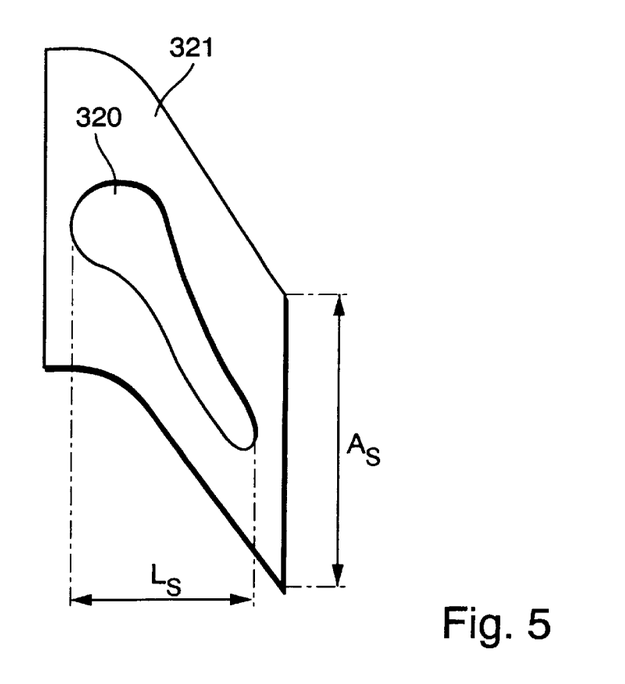
FIG. 5 shows a portion of a modified stator.

FIG. 5 shows a novel stator vane 320 and the surrounding stator area 321. A stator embodying the features of FIG. 5 exhibits the advantages of the aforedescribed stator employing vanes 310 of the character shown in FIG. 4. The vane 320 is smaller than the vane 310 because its sectional view was taken close to the radially inner region of the stator.

Those halves of the stator vanes which are nearer to the pump of the respective torque converter exhibit a rising tendency in the direction of fluid flow. On the other hand, those halves of the stator vanes which are adjacent the turbine of the respective torque converter exhibit a reversal in the axial direction or even in the opposite direction.

If the improved torque converter—lockup clutch combination is designed and installed to normally transmit torque from the internal combustion engine to the input element of an infinitely variable speed transmission (such as the aforediscussed CVT), it is of particular advantage if the lockup clutch is at least partially engaged while the vehicle is at a standstill because this at least reduces but practically eliminates the likelihood of the development of uncomfortable shocks while the transmission automatically shifts into a different gear or speed ratio. However, the just discussed advantages develop also if the improved combination of a hydrokinetic torque converter and lockup clutch cooperates with a manually shiftable or automated change-speed transmission having, for example, a reverse gear, a neutral gear and a number (e.g., five) of forward gears.

If the control unit or system for the improved hydrokinetic torque converter—lockup clutch combination is associated with a sensor 129, any interruption of depression of the brake pedal 128 preferably entails a renewed at least partial engagement of the lockup clutch (such as 102). This ensures that the crawling torque is reestablished to the desired value so that the motor vehicle can be caused to advance at the desired creeping or crawling speed, i.e., that the driven wheels receive the desired optimum or preselected crawling torque.

Without further analysis, the following will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains with hydrokinetic torque converters and, therefore, such adaptations should and are intended to be comprehended within the meaning and range of equivalence of the appended claims.

What is claimed is:

1. A fluid-operated hydrokinetic torque converter for use in a power train of a motor vehicle, comprising:
   a fluid-containing housing rotatable about a predetermined axis;
   means for connecting said housing to a rotary output element of a prime mover forming part of the power train and having idle and running conditions;
   a rotary input element coaxial with said housing;
   means for transmitting torque between said housing and said input element along a first path;
   means for transmitting torque between said housing and said input element along a second path, including an engageable and disengageable lockup clutch; and
   control means including means for supplying fluid to the torque converter and means for at least partially engaging said lockup clutch while the motor vehicle is at a standstill and said prime mover is running so that a first torque is being transmitted between said housing and said input element along said first path and a second torque is being transmitted between said housing and said input element along said second path.

2. The torque converter of claim 1, wherein said means for transmitting torque along said first path comprises a pump disposed in and rotatable with said housing and a turbine disposed in and rotatable with and relative to said housing and being non-rotatably connected with said input element.

3. The torque converter of claim 2, further comprising a stator disposed in said housing between said pump and said turbine as seen in the direction of said axis, a change-speed transmission including said input element and further including a case, and means for connecting said stator to said case.

4. The torque converter of claim 1, wherein said control means comprises means for receiving signals from a brake actuating device arranged to be applied by an operator of the motor vehicle and means for disengaging said lockup clutch, so that the transmission of torque along said second path is interrupted, in response to the application of said brake by the operator of the motor vehicle.

5. The torque converter of claim 1, wherein said control means comprises means for receiving signals from a brake actuating device arranged to be applied by an operator of the motor vehicle and means for reestablishing the transmission of torque along said first path and for disengaging said lockup clutch, so that the transmission of torque along said second path is interrupted, in response to an interruption of the application of said brake by the operator of the motor vehicle.

6. The torque converter of claim 1, wherein said lockup clutch is fully engageable and partially engageable to operate with slip and said control means comprises means for receiving signals from a brake actuating device arranged to be applied by an operator of the motor vehicle and means for partially engaging said lockup clutch in response to the application of said brake actuating device by the operator of the motor vehicle.

7. The torque converter of claim 1, wherein said lockup clutch is engageable to operate with higher and lower degrees of slip and said control means comprises means for receiving signals from a brake actuating device arranged to be applied by an operator of the motor vehicle and means for engaging said lockup clutch in response to an interruption of the application of said brake actuating device by the operator of the motor vehicle so that said lockup clutch is operated with a lower degree of slip.

8. The torque converter of claim 1, wherein said control means comprises means for receiving signals from a fuel supplying device arranged to be actuated by an operator to start the motor vehicle and means for at least partially engaging said lockup clutch in response to the actuation of said fuel supplying device to start the motor vehicle.

9. The torque converter of claim 8, wherein said lockup clutch is partially engageable to operate with slip and said means for at least partially engaging said lockup clutch in response to the actuation of said fuel supplying device to start the motor vehicle is arranged to partially engage the lockup clutch so that the lockup clutch operates with slip.

10. The torque converter of claim 8, wherein said control means further comprises means for receiving signals from a brake actuating device arranged to be applied by the operator of the motor vehicle and said means for at least partially engaging said lockup clutch in response to the actuation of said fuel supplying device is arranged to at least initially reduce the slip of said lockup clutch, when said brake actuating device is not applied, as a function of at least one of (a) time, (b) the RPM of said input element, and (c) the RPM of an output element of a transmission including said input element.

11. The torque converter of claim 8, wherein said control means further comprises means for receiving signals from a brake actuating device arranged to be applied by the operator of the motor vehicle and said means for at least partially engaging said lockup clutch in response to the actuation of said fuel supplying device is arranged to at least initially increase the transmission of torque along said second path by way of said lockup clutch from zero to a preselected value as a function of (a) time, (b) the RPM of said input element, and (c) the speed of the motor vehicle.

12. The torque converter of claim 11, wherein said preselected value is variable as a function of at least one of said speed of the motor vehicle and said RPM of said input element.

13. The torque converter of claim 1, wherein said control means comprises means for receiving signals from a brake actuating device arranged to be applied by an operator of the motor vehicle and means for reducing the magnitude of the torque being transmittable along said second path in response to the application of said brake actuating device.

14. The torque converter of claim 1, wherein said control means comprises means for receiving signals from a brake actuating device arranged to be applied by an operator of the motor vehicle and means for reducing the extent of engagement of said lockup clutch for the transmission of a predetermined minimum torque as a function of at least one of the RPM of said input element and the speed of the motor vehicle in response to the application of said brake actuating device.

15. The torque converter of claim 14, wherein said predetermined minimum torque is reached when the speed of the motor vehicle is one of zero speed and a speed close to zero speed.

16. The torque converter of claim 1, wherein said input element forms part of a shiftable change-speed transmission and said means for at least partially engaging said lockup clutch is effective during shifting of said transmission.

17. A fluid-operated hydrokinetic torque converter for use in a power train of a motor vehicle, comprising:

a fluid-containing housing rotatable about a predetermined axis;

means for connecting said housing to a rotary output element of a prime mover forming part of the power train;

a rotary input element coaxial with said housing;

means for transmitting torque between said housing and said input element along a first path including a pump disposed in and rotatable with said housing, a turbine disposed in and rotatable with and relative to to said housing and connected to said input element, and a stator disposed in said housing between said turbine and said pump as seen in the direction of said axis, said pump having an outer wall remote from said turbine and said turbine having an outer wall remote from said pump, as considered in the direction of said axis, said turbine and said pump and said stator together forming a torus having a width as measured radially of said axis and a length as measured in the direction of said axis and the ratio of said length to said width being at most 0.65;

means for transmitting torque between said housing and said input element along a second path, including an engageable and disengageable lockup clutch; and control means including means for supplying fluid to said the torque converter.

18. The torque converter of claim 17, wherein said ratio at most equals 0.6.

19. The torque converter of claim 17, wherein said ratio is between 0.4 and 0.6.

20. The torque converter of claim 17, wherein said ratio is between 0.5 and 0.55.

21. The torque converter of claim 17, wherein said torus includes a first portion nearer to and a second portion more distant from said axis, said length being the length of said first portion of said torus.

22. The torque converter of claim 17, wherein said torus includes a first portion disposed at a first distance from said axis, a second portion disposed at a greater second distance from said axis, and a third portion disposed at a third distance from said axis, said third distance being between about 20% and 40% of the difference between said first and second distances and said length being the length of said third portion of said torus.

23. The torque converter of claim 22, wherein said third distance is between about 25% and 35% of said difference between said first and second distances.

* * * * *